United States Patent
Rivest et al.

(10) Patent No.: US 6,269,163 B1
(45) Date of Patent: Jul. 31, 2001

(54) ENHANCED BLOCK CIPHERS WITH DATA-DEPENDENT ROTATIONS

(75) Inventors: Ronald L. Rivest, Arlington, MA (US); Matthew John Barton Robshaw, San Francisco, CA (US); Raymond Mark Sidney, Foster City, CA (US); Yiqun Lisa Yin, San Mateo, CA (US)

(73) Assignee: RSA Security Inc., Bedford, MA (US)

( * ) Notice: Subject to any disclaimer, the term of this patent is extended or adjusted under 35 U.S.C. 154(b) by 0 days.

(21) Appl. No.: 09/094,649

(22) Filed: Jun. 15, 1998

(51) Int. Cl.$^7$ ........................................... H04K 1/00
(52) U.S. Cl. .................. 380/28; 380/1; 380/42; 380/43; 380/37; 380/28; 380/29
(58) Field of Search .................. 380/43, 42, 37, 380/29, 28

(56) References Cited

U.S. PATENT DOCUMENTS

| | | | |
|---|---|---|---|
| 4,078,152 | 3/1978 | Tuckerman, III | 380/37 |
| 4,157,454 | 6/1979 | Becker | 380/37 |

(List continued on next page.)

FOREIGN PATENT DOCUMENTS

WO 91/18459   11/1991   (WO) .............................. H04L/9/06

OTHER PUBLICATIONS

Biryukov, Alex et al., "Improved Cryptanalysis of RC5," 8 pages presented at Eurocrypt '98, May 31–Jun. 4, 1998, http://www.cs.technion.ac.il/~eyalk/pub.html.

Kaliski, Jr., B. et al., "On Differential and Linear Cryptanalysis of RC5 Encryption Algorithm," pp. 171–184, in D. Coppersmith ed., *Advances in Cryptology—CRYPTO '95*, LNCS No. 963, 1995.

Knudsen, L. et al., "Improved Differential Attacks of RC5," pp. 216–228, presented at CRYPTO '96, Aug. 18–22, 1996, http://www.cs.technion.ac.il/~/pub.html.

Madryga, W.E., "A High Performance Encryption Algorithm," in J. H. Finch and E.G. Dougall eds., *Computer Security: A Global Challenge*, pp. 557–570, 1984.

(List continued on next page.)

*Primary Examiner*—Thomas R. Peeso
*Assistant Examiner*—Todd Jack
(74) *Attorney, Agent, or Firm*—Testa, Hurwitz, & Thibeault, LLP

(57) ABSTRACT

A plaintext message to be encrypted is segmented into a number of words, e.g., four words stored in registers A, B, C and D, and an integer multiplication function is applied to a subset of the words, e.g., to the two words in registers B and D. The integer multiplication function may be a quadratic function of the form $f(x)=x(ax+b)$ or other suitable function such as a higher-order polynomial. The results of the integer multiplication function are rotated by lg w bits, where lg denotes log base 2 and w is the number of bits in a given word, to generate a pair of intermediate results t and u. An exclusive-or of another word, e.g., the word in register A, and one of the intermediate results, e.g., t, is rotated by an amount determined by the other intermediate result u. Similarly, an exclusive-or of the remaining word in register D and the intermediate result u is rotated by an amount determined by the other intermediate result t. An element of a secret key array is applied to each of these rotation results, and the register contents are then transposed. This process is repeated for a designated number of rounds to generate a ciphertext message. Pre-whitening and post-whitening operations may be included to ensure that the input or output does not reveal any internal information about any encryption round. Corresponding decryption operations may be used to decrypt the ciphertext message.

29 Claims, 6 Drawing Sheets

---

Encryption with RC6-*w*/*r*/*b*

Input:  Plaintext stored in four *w*-bit input registers *A*,*B*,*C*,*D*
        Number *r* of rounds
        *w*-bit round keys *S*[0,...,2*r* + 3]

Output: Ciphertext stored in *A*,*B*,*C*,*D*

Procedure: $B = B + S[0]$
$D = D + S[1]$
for $i = 1$ to $r$ do
{

$t = (B \times (2B + 1)) \lll \lg w$
$u = (D \times (2D + 1)) \lll \lg w$
$A = ((A \oplus t) \lll u) + S[2i]$
$C = ((C \oplus u) \lll t) + S[2i+1]$
$(A,B,C,D) = (B,C,D,A)$ }
$A = A + S[2r + 2]$
$C = C + S[2r + 3]$

U.S. PATENT DOCUMENTS

| | | | |
|---|---|---|---|
| 4,249,180 | | 2/1981 | Eberle et al. .......................... 380/37 |
| 4,255,811 | | 3/1981 | Adler ................................... 380/37 |
| 4,724,541 | | 2/1988 | Mallick ................................ 380/28 |
| 4,982,429 | * | 1/1991 | Takaragi et al. ..................... 380/28 |
| 5,003,597 | | 3/1991 | Merkle ................................. 380/37 |
| 5,054,067 | | 10/1991 | Moroney et al. ................... 380/37 |
| 5,214,704 | | 5/1993 | Mittenthal ........................... 380/37 |
| 5,297,206 | * | 3/1994 | Orton .................................. 380/30 |
| 5,351,299 | | 9/1994 | Matsuzaki et al. ................. 380/37 |
| 5,454,039 | | 9/1995 | Coppersmith et al. ............ 380/28 |
| 5,675,653 | * | 10/1997 | Nelson, Jr. ......................... 380/28 |
| 5,724,428 | | 3/1998 | Rivest ................................. 380/37 |
| 5,740,250 | * | 4/1998 | Moh .................................... 380/28 |

OTHER PUBLICATIONS

Matsui, Mitsuru, "Linear Cryptanalysis Method for DES Cipher," in T. Helleseth ed., *Advances in Cryptology—Eurocrypt '93*, pp. 386–396, 1994.

Rivest, Ronald, "The RC5 Encryption Algorithm," *Dr. Dobb's Journal*, Jan. 1995, pp. 146–148.

Rivest, Ronald, "The RC5 Encryption Algorithm," 11 pages, in *Fast Software Encryption, Second International Workshop*, pp. 86–96, 1995.

Rivest, Ronald, et al., "The RC6™ Block Cipher," pp. 1–20, http://theory.lcs.mit.edu/~rivest/publications.html, downloaded Jun. 19, 1998.

Rivest, Ronald, "Further Notes on RC6, Last updated Jun. 20, 1998," 1 page http://theory.lcs.mit.edu/~rivest/publications.html, downloaded Sep. 25, 1998.

Selcuk, Ali Aydin, "New Results in Linear Cryptanalysis of RC5," pp. 1–16, Fast Software Encryption Conference, Paris, Mar. 1998.

Schneier, Bruce, "Applied Cryptography, Protocols, Algorithms, and Source Code in C," John Wiley & Sons, Inc., 1994, pp. 154–185; 219–272.

* cited by examiner

Encryption with RC6-$w/r/b$

Input:  Plaintext stored in four $w$-bit input registers $A,B,C,D$
Number $r$ of rounds
$w$-bit round keys $S[0,...,2r+3]$ Output:  Ciphertext stored in $A,B,C,D$ Procedure:  $B = B + S[0]$
$D = D + S[1]$
for $i = 1$ to $r$ do
{

$t = (B \times (2B + 1)) \lll \lg w$
$u = (D \times (2D + 1)) \lll \lg w$
$A = ((A \oplus t) \lll u) + S[2i]$
$C = ((C \oplus u) \lll t) + S[2i+1]$
$(A,B,C,D) = (B,C,D,A)$ }
$A = A + S[2r + 2]$
$C = C + S[2r + 3]$

FIG. 1

Decryption with RC6-$w/r/b$

Input: Ciphertext stored in four $w$-bit input registers $A, B, C, D$
Number $r$ of rounds
$w$-bit round keys $S[0,...,2r+3]$ Output: Plaintext stored in $A, B, C, D$ Procedure: $C = C - S[2r+3]$
$A = A - S[2r+2]$
for $i = r$ downto 1 do
{

$(A, B, C, D) = (D, A, B, C)$
$u = (D \times (2D+1)) \lll \lg w$
$t = (B \times (2B+1)) \lll \lg w$
$C = ((C - S[2i+1]) \ggg t) \oplus u$
$A = ((A - S[2i]) \ggg u) \oplus t$

Key schedule for RC6-$w/r/b$

Input: User-supplied $b$ byte key preloaded into the $c$-word array $L[0,...,c-1]$
Number $r$ of rounds Output: $w$-bit round keys $S[0,...,2r+3]$ Procedure: $S[0] = P_w$ for $i = 1$ to $2r + 3$ do
        $S[i] = S[i-1] + Q_w$ $A = B = i = j = 0$ $v = 3 \times \max\{c, 2r+4\}$
    for $s = 1$ to $v$ do
      {
        $A = S[i] = (S[i] + A + B) \lll 3$
        $B = L[j] = (L[j] + A + B) \lll (A + B)$
        $i = (i + 1) \bmod (2r + 4)$
        $j = (j + 1) \bmod c$
    }

FIG. 5

ENHANCED BLOCK CIPHERS WITH DATA-DEPENDENT ROTATIONS

FIELD OF THE INVENTION

The present invention relates generally to cryptography, and more particularly to block ciphers for implementing encryption and decryption operations in cryptographic applications.

BACKGROUND OF THE INVENTION

In a conventional block cipher cryptographic system, a plaintext message is encrypted using a secret key, and is transmitted in its encrypted form. A receiver decrypts the encrypted message using the same secret key in order to recover the plaintext message. An example of a conventional block cipher is the Data Encryption Standard (DES) cipher. DES and other conventional block ciphers are described in B. Schneier, Applied Cryptography, pp. 154–185 and 219–272, John Wiley & Sons, New York, 1994, which is incorporated by reference herein. An improved block cipher utilizing data-dependent rotations is described in U.S. Pat. No. 5,724,428, issued Mar. 3, 1998 in the name of inventor R. L. Rivest, which is incorporated by reference herein. This improved cipher is referred to as RC5™, which is a trademark of RSA Data Security, Inc. of Redwood City, Calif., the assignee of U.S. Pat. No. 5,724,428. The RC5™ block cipher in an illustrative embodiment provides improved performance in part through the use of data-dependent rotations in which a given word of an intermediate encryption result is cyclically rotated by an amount determined by low-order bits of another intermediate result.

The security of the RC5™ block cipher is analyzed in, for example, in B. S. Kaliski Jr. and Y. L. Yin, "On Differential and Linear Cryptanalysis of the RC5™ Encryption Algorithm," in D. Coppersmith, ed., Advances in Cryptology—Crypto '95, Vol. 963 of Lecture Notes in Computer Science, pp. 171–184, Springer Verlag, 1995; L. R. Knudsen and W. Meier, "Improved Differential Attacks on RC5™," in N. Koblitz, ed., Advances in Cryptology—Crypto '96, Vol. 1109 of Lecture Notes in Computer Science, pp. 216–228, Springer Verlag, 1996; A. A. Selcuk, "New Results in Linear Cryptanalysis of RC5™," in S. Vaudenay, ed., Fast Software Encryption, Vol. 1372 of Lecture Notes in Computer Science, pp. 1–16, Springer Verlag, 1998; and A. Biryukov and E. Kushelevitz, "Improved Cryptanalysis of RC5™," to appear in proceedings of Advances in Cryptology—Eurocrypt '98, Lecture Notes in Computer Science, Springer Verlag, 1998; all of which are incorporated by reference herein. These analyses have provided a greater understanding of how the structure and operations of RC5™ contribute to its security. Although no practical attack on RC5™ has been found, the above-cited references describe a number of interesting theoretical attacks.

It is therefore an object of the present invention to provide a further improved block cipher which not only exhibits additional security by thwarting one or more of the above-noted theoretical attacks, but also exhibits an enhanced implementability in a wide variety of cryptographic applications.

SUMMARY OF THE INVENTION

The present invention provides an improved block cipher in which data-dependent rotations are influenced by an additional primitive operation which is in the form of an integer multiplication. The use of such an integer multiplication greatly increases the diffusion achieved per round of encryption, allowing for higher security per round, and increased throughput. The integer multiplication is used to compute rotation amounts for data-dependent rotations, such that the rotation amounts are dependent on substantially all of the bits of a given register, rather than just low-order bits as in the above-described embodiment of the RC5™ block cipher.

In an illustrative embodiment of the invention, a plaintext message to be encrypted is segmented into four words stored in registers A, B, C and D, and an integer multiplication function is applied to two of the words in registers B and D. The integer multiplication function may be a quadratic function of the form $f(x)=x(ax+b)$, where a is an even integer and b is an odd integer. Other types of functions, including polynomials with degree greater than two, may be used in alternative embodiments. The results of the integer multiplication function in the illustrative embodiment are rotated by lg w bits, where lg denotes log base 2 and w is the number of bits in a given word, to generate a pair of intermediate results t and u. An exclusive-or of the contents of another register, e.g., A, and one of the intermediate results, e.g., t, is rotated by an amount determined by the other intermediate result u. Similarly, an exclusive-or of the contents of the remaining register D and the intermediate result u is rotated by an amount determined by the other intermediate result t. An element of a secret key array is applied to each of these rotate results, and the register contents are then transposed. This process is repeated for a designated number of rounds to generate a ciphertext message. Pre-whitening and post-whitening operations may be included to ensure that the input or output does not reveal any internal information about any encryption round. For example, the values in registers B and D may be pre-whitened before starting the first round by applying elements of the secret key array to these values. Similarly, the values in registers A and C may be post-whitened after completion of the designated number of rounds by applying elements of the secret key array to these values. Corresponding decryption operations may be used to recover the original plaintext message.

BRIEF DESCRIPTION OF THE DRAWINGS

FIGS. 1 and 3 show exemplary encryption and decryption processes, respectively, in accordance with illustrative embodiments of the invention.

FIG. 5 shows an exemplary key generation process in accordance with the invention.

DETAILED DESCRIPTION OF THE INVENTION

Figure 2:
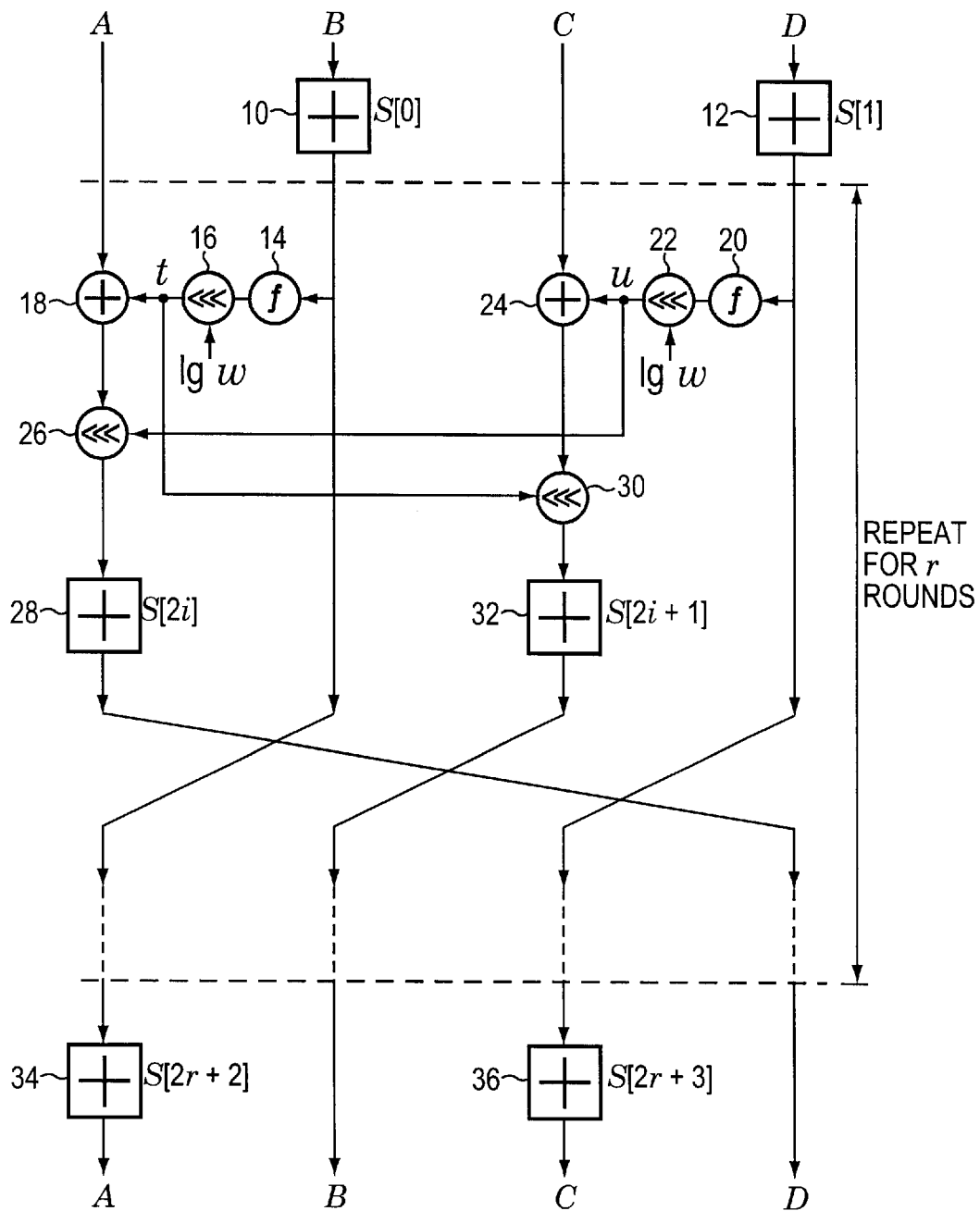
FIGS. 2 and 4 are diagrams illustrating the computations involved in the encryption and decryption processes of FIGS. 1 and 3, respectively.

The illustrative embodiment of the invention to be described below is designed to meet the requirements of the Advanced Encryption Standard (AES) as set forth by the National Institute of Standards and Technology (NIST). To meet the requirements of the AES, a block cipher must handle 128-bit input and output blocks. The specified target architecture and languages for the AES do not yet support 64-bit operations in an efficient and clean manner. The illustrative embodiment to be described below uses four 32-bit registers. The invention thus exploits 32-bit operations, such as integer multiplications, that are efficiently implemented on modern processors.

The illustrative block cipher in accordance with the invention is referred to as RC6™, which is a trademark of RSA Data Security, Inc. of Redwood City, Calif., assignee of the present application. Like the above-described RC5™ block cipher, the RC6™ block cipher in accordance with the invention may be viewed as a parameterized family of encryption algorithms. A given version of RC6™ can be specified as RC6™-w/r/b, where the word size is w bits, the encryption process includes a nonnegative number of rounds r, and b denotes the length of the encryption key in bytes. Of particular relevance to the AES will be versions of RC6™ with 16-, 24- and 32-byte keys. For all variants in the illustrative embodiment, RC6™-w/r/b operates on four w-bit words using the following six basic operations. The base-two logarithm of w will be denoted by lg w.

a+b integer addition modulo $2^w$
a−b integer subtraction modulo $2^w$
a⊕b bitwise exclusive-or of w-bit words
a×b integer multiplication modulo $2^w$
a<<<b rotate the w-bit word a to the left by the amount given by the least significant lg w bits of b
a>>>b rotate the w-bit word a to the right by the amount given by the least significant lg w bits of b Note that in the following description of RC6™ the term "round" is in accordance with the more established DES-like idea of a round, i.e., half of the data is updated by the other half, and the two are then swapped. Various descriptions of the RC5™ block cipher have used the term "half-round" to describe this type of action, such that a given RC5™ round included two half-rounds. The present description will utilize the more established meaning of a "round."

FIG. 1 illustrates an encryption process in accordance with the illustrative embodiment of the invention. As noted above, the illustrative embodiment uses four w-bit input registers. These registers, which are designated A, B, C and D, contain an initial plaintext message to be encrypted, as well as the output ciphertext message at the end of encryption. The designations A, B, C and D will also be used herein to refer to the contents of the registers. The first byte of plaintext or ciphertext is placed into the least-significant byte of A; the last byte of plaintext or ciphertext is placed into the most-significant byte of D. The operation (A, B, C, D)=(B, C, D, A) denotes the parallel assignment of values on the right to registers on the left. In the encryption process of FIG. 1, the user supplies a key of b bytes. Extra zero bytes are appended to the key if necessary to make the length of the key a non-zero multiple of four bytes. From this, 2r+4 w-bit words are derived which are stored in an array S[0, . . . , 2r+3]. This array is used in both encryption and decryption. Additional aspects of the key schedule are described below in conjunction with FIG. 5.

The input to the encryption process of FIG. 1 includes a plaintext message stored in registers A, B, C and D, a specified number r of rounds, and the w-bit secret key in the form of the above-noted array S[0, . . . , 2r+3]. The output ciphertext is stored in the registers A, B, C and D. The steps of the encryption process are shown as pseudocode in FIG. 1, and are illustrated in a process diagram in FIG. 2. Referring to FIG. 2, the operations between the horizontal dashed lines are repeated in the for loop of the pseudocode for each of the r rounds. Before entering the loop, the contents of register B are summed in operation 10 with S[0] from the secret key array, and the contents of register D are summed in operation 12 with S[1] from the array. These operations provide "pre-whitening" which prevents the plaintext from revealing part of the input to the first round of encryption.

The pre-whitened value of B is supplied to an operation 14 which generates a function $f(x)=x(2x+1)$, where x is the input of the function, i.e., the pre-whitened value of B in operation 14. A general function of the form:

$$f(x)=x(ax+b)(\mathrm{mod}\ 2^w)$$

has the following properties: (i) when a is even and b is odd, $f(x)$ maps $\{0, 1, \ldots, 2^w-1\}$ onto itself, i.e., it is a permutation such that each input x gives a different result; and (ii) when a=2 and b=1, every bit of the input x has some effect on the high order lg w bits of $f(x)$ for most inputs x. The above-noted function $f(x)=x(2x+1)$ is an example of an integer multiplication function which provides properties (i) and (ii). Other functions which provide these or similar properties, including higher-order polynomials, could be used in alternative embodiments of the invention. One such alternative is a function in which a is zero and b is an odd integer which varies from round to round. It should be noted that, although the output of the general function in the form given above is taken mod $2^w$, this is not a requirement of an integer multiplication function in accordance with the invention. The term "integer multiplication function" as used herein should be understood to include any function involving integer multiplication, including an integer multiplication itself.

The output of operation 14, which corresponds to (B×(2B+1)), is then rotated to the left by lg w bits in operation 16, and the result t is exclusive-or'd with A in operation 18. The same function $f(x)=x(2x+1)$ is applied in operation 20 to the pre-whitened value of D. The output of operation 20, which corresponds to (D×(2D+1)), is rotated to the left by lg w bits in operation 22, and the result u is exclusive-or'd with C in operation 24. Operation 26 rotates the results of the exclusive-or of A and t to the left by an amount given by the least significant lg w bits of u, and the element S[2i] of the secret key array is added in step 28 to the result of the rotation. Operation 30 rotates the results of the exclusive-or of C and u to the left by an amount given by the least significant lg w bits of t, and the element S[2i+1] of the secret key array is then added in step 32 to the result of the rotation. The operation (A, B, C, D)=(B, C, D, A) is then applied, such that A receives the pre-whitened value of B, register B receives the output of operation 32, register C receives the pre-whitened value of D, and register D receives the output of operation 28. As previously noted, the operations between the horizontal dashed lines in FIG. 2 are repeated for r rounds. At the completion of the r rounds, the values of A and C are subject to "post-whitening" operations 34 and 36, respectively, to ensure that the resulting ciphertext will not reveal any part of the input to the last round of encryption. Operations 34 and 36 add elements S[2r+2] and S[2r+3] to the respective A and C values to generate post-whitened values of A and C. The registers A, B, C and D then contain the encrypted ciphertext corresponding to the original plaintext.

Figure 4:
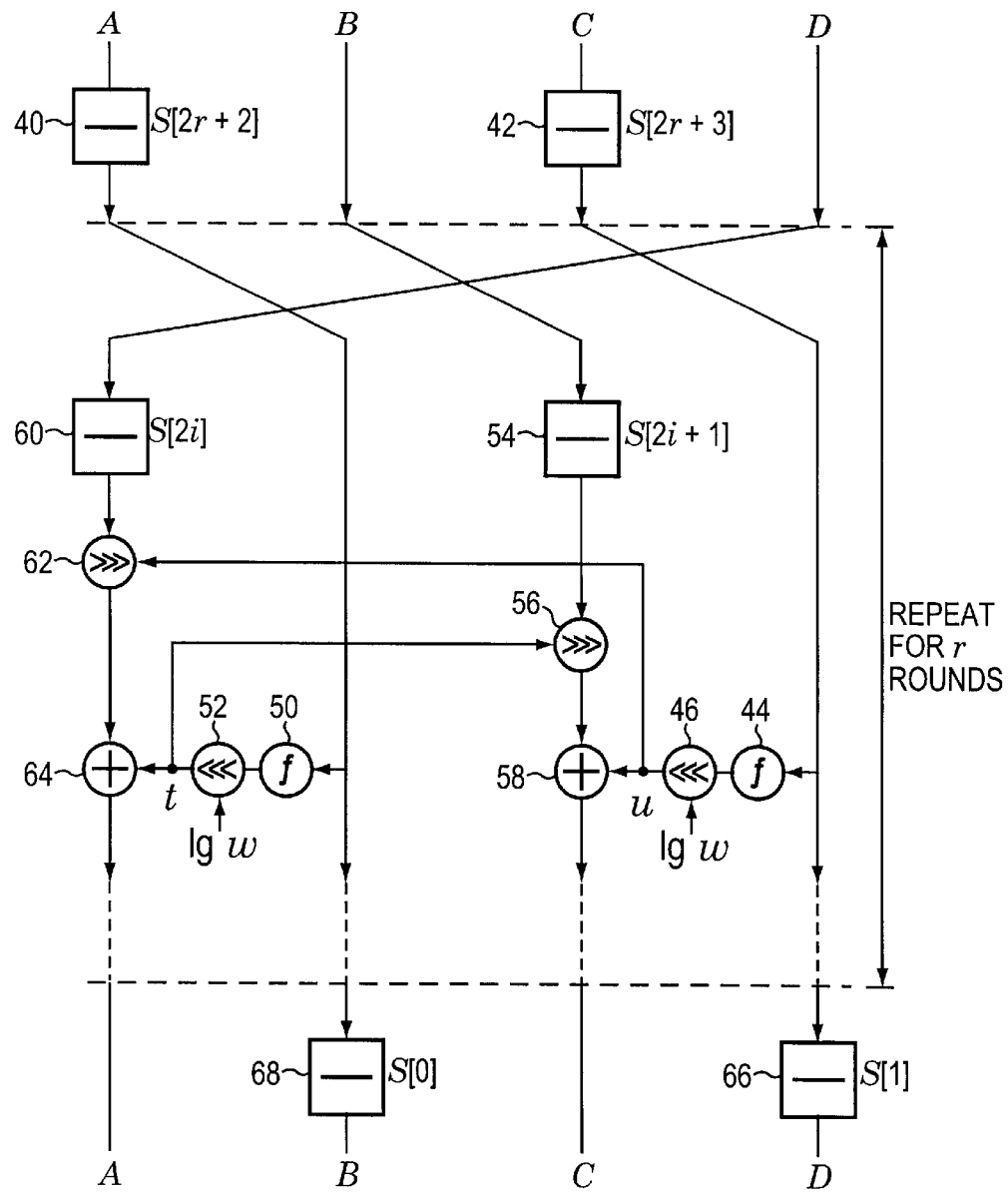

The corresponding steps of the decryption process are shown as pseudocode in FIG. 3 and illustrated in a process diagram in FIG. 4. The input to the decryption process is the ciphertext stored in the four w-bit registers A, B, C and D, the number of rounds r, and the secret round key array S[0, . . . , 2r+3]. The output of the decryption process is the original plaintext. Operations 40 and 42 update the values of A and C to reverse the post-whitening operations 34 and 36, respectively of FIG. 2. The operations between the horizontal dashed lines in FIG. 4 are then repeated for each of the r rounds, and correspond to the operations within the for loop in the pseudocode of FIG. 3. Within the loop, the operation (A, B, C, D)=(D, A, B, C) is applied, such that A receives the value of D, register B receives the revised value of A generated in operation 40, register C receives the value of B, and register D receives the revised value of C generated in operation 42.

The function $f(x)=x(2x+1)$ is applied in operation 44 to D, and the result, which corresponds to $(D\times(2D+1))$, is rotated to the left by lg w bits in operation 46 to generate u. Similarly, the function $f(x)=x(2x+1)$ is applied in operation 50 to B, and the result, which corresponds to $(B\times(2B+1))$, is rotated to the left by lg w bits in operation 52 to generate t. The element S[2i+1] of the secret key array is subtracted in operation 54 from C, and the result is rotated to the right in operation 56 by the least significant lg w bits of t. In operation 58, C takes on the result of the exclusive-or of u and the output of the rotate operation 56. Similarly, the element S[2i] of the secret key array is subtracted in operation 60 from A, and the result is rotated to the right in operation 62 by the least significant lg w bits of u. In operation 64, A takes on the result of the exclusive-or of t with the output of the rotate operation 62. After the r rounds are completed, operations 66 and 68 update the values of D and B to reverse the pre-whitening operations 12 and 10, respectively, of FIG. 2.

The above-described illustrative embodiment includes at least two significant changes relative to the conventional RC5™ block cipher. These are the introduction of the quadratic function $f(x)=x(2x+1)$ and the fixed rotation by lg w bits. The use of the quadratic function is aimed at providing a much faster rate of diffusion thereby improving the chances that simple differentials will spoil rotation amounts much sooner than in RC5™. The quadratically transformed values of B and D are used in place of B and D as additives for the registers A and C, increasing the non-linearity of the cipher while not losing any entropy (since the transformation is a permutation). The fixed rotation plays a simple yet important role in hindering both linear and differential cryptanalysis.

FIG. 5 shows an example of a key schedule suitable for use in generating the secret key array S[0, . . . , 2r+3] used in the illustrative embodiment of FIGS. 1 through 4. The key schedule of FIG. 5 is similar to that used for RC5™ and described in detail in the above-cited U.S. Pat. No. 5,724,428, but derives more words from the user-supplied key for use during encryption and decryption. The key schedule uses two w-bit registers A and B, along with variables i,j, v and s. The inputs to the key schedule are a user-supplied key of b bytes, and the number of rounds r. The output is the array S[0, . . . , 2r+3] of w-bit round keys. Extra zero bytes are appended to the user-supplied key if necessary to make the length of the key a non-zero multiple of w/8 bytes. This is then stored as a sequence of c w-bit words L[0], . . . L[c−1], with the first byte of the key stored as the low-order byte of L[0], etc., and L[c−1] padded with high order zero bytes if necessary. Note that if b=0, then c=1 and L[0]=0.

In the key generation procedure shown in FIG. 5, element S[0] is initiated to a designated constant $P_w$. In the first for loop, the elements S[i] are initialized using a constant $Q_w$, and values of A, B, i and j are set to zero. The second for loop generates w-bit words for the secret key array. The number of w-bit words that will be generated for the round keys is 2r+4 and these are stored in the array S[0, . . . , 2r+3]. The constants $P_w$ and $Q_w$ in FIG. 5 may be, for example, $P_{32}$=B7E15163 and $Q_{32}$=9E3779B9 (hexadecimal), i.e., the so-called "magic constants" used for the RC5™ key schedule in U.S. Pat. No. 5,724,428. The value of $P_{32}$ is derived from the binary expansion of e −2, where e is the base of the natural logarithm function. The value of $Q_{32}$ is derived from the binary expansion of φ−1, where φ is the Golden Ratio. Similar definitions for $P_{64}$, $Q_{64}$ and so on can be used for versions of RC6™ with other word sizes. It should be noted that these values are to some extent arbitrary, and other values could be used in alternative embodiments of the invention. Other suitable key schedules could also be used in place of the FIG. 5 key schedule.

Figure 6:
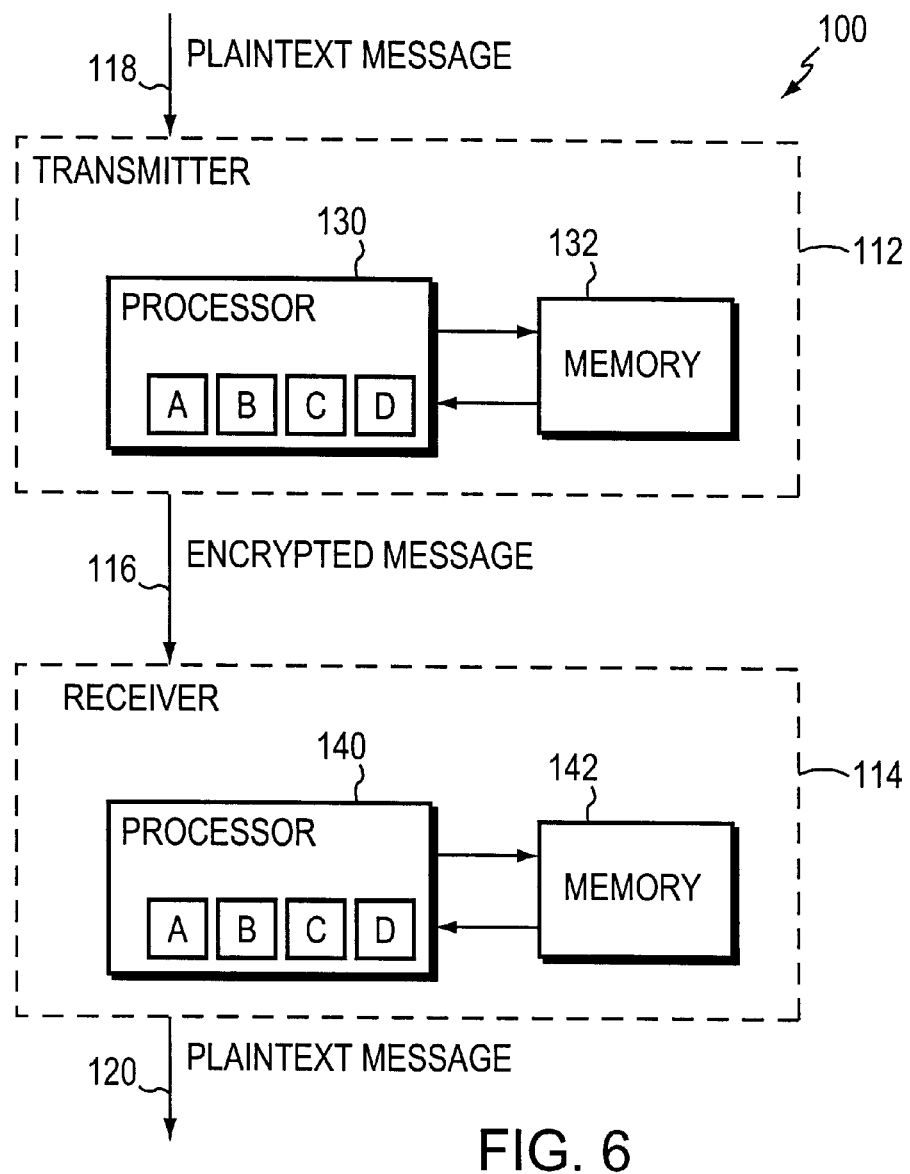
FIG. 6 shows an illustrative system incorporating encryption and decryption processes in accordance with the invention.

FIG. 6 shows one possible implementation of the invention. A secure communication system 100 includes a transmitter 112 and a receiver 114 which communicate over a channel 116. A plaintext message is applied to an input 118 of the transmitter 112, and processed using the encryption techniques described in conjunction with FIGS. 1 and 2 to generate an encrypted message which is transmitted over the channel 116 to the receiver 114. The receiver 114 processes the encrypted message using the decryption techniques described in conjunction with FIGS. 3 and 4 to generate the corresponding plaintext message at an output 120. In this embodiment, the encryption techniques may be implemented in software which is executed by a processor 130 which includes the registers A, B, C and D previously described. Software instructions for carrying out the encryption may be stored in a memory 132 from which they are retrieved and executed by the processor 130. Similarly, the decryption techniques may be implemented in software which is executed by a processor 140 which also includes the registers A, B, C and D. Software instructions for carrying out the decryption may be stored in a memory 142 from which they are retrieved and executed by the processor 140. The registers A, B, C and D need not be internal to the processors 130 and 140, and in other embodiments could be, for example, part of the respective memories 132 and 142. Software implementations of the invention are very efficient in that the invention in the illustrative embodiment uses primitive operations, e.g., add, subtract, multiply, exclusive-or and rotate, that are very well-supported on available microprocessors.

The transmitter 112 and receiver 114 may be, for example, computers or other digital data processing devices connected by a local area network, a wide area network, an intranet, the Internet or any other suitable network. Alternatively, the transmitter 112 may be a smart card, and the receiver 114 may be a card reader. The communication channel 116 in such an embodiment is a connection established between the card and the reader when the card is inserted in the reader. In these and other embodiments of the invention, the encryption and decryption processes may be directly implemented in the processors 130 and 140 using hard-wired computation circuitry. In still other embodiments, combinations of hardware and software may be used to implement the encryption and decryption. The invention can also be implemented in the form of software stored on a computer-readable medium, such as a magnetic disk, an optical compact disk or an electronic memory. The term "processor" as used herein should be understood to include a microprocessor, central processing unit (CPU), microcontroller or other processing unit of a computer, set-top box, smart card, card reader, wireless terminal, personal digital assistant or other communication device, an application-specific integrated circuit (ASIC), field-programmable gate array (FPGA) device or other type of hardware configured to provide one or more of the computations described in conjunction with FIGS. 1 through 4, or any other type of device capable of implementing at least a portion of an encryption or decryption operation in accordance with the invention using hardware, software, or combinations thereof. The term "memory" should be understood to include an electronic random access memory (RAM) or other type of memory external to the above-defined processor, such as memory 132 or 142 of FIG. 6, or a memory which is internal to the processor, such as a processor memory which includes the registers A, B, C and D in FIG. 6.

Illustrative performance measurements for the above-described encryption and decryption processes are given in TABLE 1 below. The performance figures do not include key setup, and are therefore applicable to any key size b. The performance figures shown here for an optimized ANSI C implementation of RC6™-32/20/b were obtained using the compiler in Borland C++ Development Suite 5.0 as specified in the AES submission requirements. Performance was measured on a 266 MHz Pentium II computer with 32 MBytes of RAM running Windows 95. To improve the precision of the timing measurements, maskable interrupts on the processor were disabled while the timing tests were executed. The figures shown for an assembly language implementation of RC6™-32/20/16 were obtained on the same computer under similar conditions. The performance figures given for an optimized Java implementation of RC6™-32/20/b were measured on a 180 MHz Pentium II computer with 64 Mbytes of RAM running Windows NT 4.0. This implementation was compiled on Javasoft's JDK 1.1.6 compiler, and the performance of the resulting byte code was measured both on Javasoft's JDK 1.1.6 interpreter (with JIT compilation disabled) and on Symantec Corporation's Java! JustInTime Compiler Version 210.054 for JDK 1.1.2. The figures shown have been scaled to 200 MHz, and it is expected that the AES-specified reference platform will produce comparable, or slightly improved, figures. TABLE 2 shows, for purposes of comparison, corresponding figures for RC5™-32/16/16 for the ANSI C, Java (JIT) and assembly implementations, generated using similar methodologies. The figures in TABLES 1 and 2 are averages generated over ten executions of the described computations.

TABLE 1

Performance Figures for RC6 ™-32/20/b

| Technique | | Cycles/Block | Blocks/sec at 200 MHz | MBytes/sec at 200 MHz |
|---|---|---|---|---|
| ANSI C | RC6 ™-32/20/b encrypt | 616 | 325,000 | 5.19 |
| ANSI C | RC6 ™-32/20/b decrypt | 566 | 353,000 | 5.65 |
| JAVA (JDK) | RC6 ™-32/20/b encrypt | 16,200 | 12,300 | 0.197 |
| JAVA (JDK) | RC6 ™-32/20/b decrypt | 16,500 | 12,100 | 0.194 |
| JAVA (JIT) | RC6 ™-32/20/b encrypt | 1,010 | 197,000 | 3.15 |
| JAVA (JIT) | RC6 ™-32/20/b decrypt | 955 | 209,000 | 3.35 |
| Assembly | RC6 ™-32/20/b encrypt | 254 | 787,000 | 12.6 |
| Assembly | RC6 ™-32/20/b decrypt | 254 | 788,000 | 12.6 |

TABLE 2

Performance Figures for RC5 ™-32/16/16

| Technique | | Cycles/Block | Blocks/sec at 200 MHz | MBytes/sec at 200 MHz |
|---|---|---|---|---|
| ANSI C | RC5 ™-32/20/16 encrypt | 328 | 609,756 | 4.9 |
| JAVA (JIT) | RC5 ™-32/20/16 decrypt | 1,143 | 174,978 | 1.4 |
| Assembly | RC5 ™-32/20/16 decrypt | 148 | 1,351,351 | 10.8 |

It can be seen that the RC6™-32/20/b encryption process provides greater throughput in Mbytes/sec at 200 MHz than the corresponding RC5™-32/16/16 encryption process, for each of the three exemplary software implementations of TABLE 2. As noted above, the encryption times given in TABLES 1 and 2 do not include key setup, and are independent of the length of the user-supplied key. It is expected that the key setup required for both RC6™-32/20/b and RC5™-32/16/b will be approximately the same. Timings in the ANSI C case were obtained by encrypting or decrypting a single 3,000-block piece of data. The timings in Java and assembly were obtained by encrypting or decrypting a single block 10,000 times. Faster implementations may well be possible.

Estimates will now be given for the performance of RC6™-32/20/16 on 8-bit platforms such as those that may be found in smart cards and other similar devices. In particular, estimates will be considered for the Intel MCS-51 microcontroller family. It is expected that the estimates can be considered to hold for other types of processors, such as the Philips 80C51 family, that have similar instruction sets and timings. A given round of RC6™-32/20/16 encryption includes six additions, two exclusive-ors, two squarings, two left-rotates by lg 32=5 bits, and two left-rotates by a variable quantity r. Note that this counts $(B \times (2B+1)) = 2B^2 + B$ as a squaring and two additions. These basic operations can be implemented on an 8-bit processor in the following manner, ignoring addressing instructions:

1. A 32-bit addition can be computed using four 8-bit additions with carry (ADDC).
2. A 32-bit exclusive-or can be computed using four 8-bit exclusive-ors (XRL)
3. A 32-bit squaring can be computed using six 8-bit by 8-bit multiplications (MUL) and eleven ADDCs. Note that six multiplications are enough since we only need the lower 32 bits of the 64-bit product.
4. Rotating a 32-bit word left by five can be computed by rotating the word right by one bit position three times and then permuting the four bytes. Note that rotating the word right by one bit position can be done using four byte rotations with carry (RRC).
5. Rotating a 32-bit word left by r can be computed by rotating the word left or right by one bit position r' times (r'≦4, with average two) and then permuting the four bytes appropriately. The five bits of r are used to determine r' and the permutation which can be controlled using jumps (JB).
6. Most instructions take one cycle except MUL which takes four cycles and JB which takes two cycles.

Using the above observations, the total number of processor clock cycles needed to implement one round of RC6™-32/20/16 on an 8-bit microcontroller or other similar platform is summarized in TABLE 3 below.

TABLE 3

Number of Cycles for One Round of RC6 ™-32/20/16 on 8-bit Platform

| Operation | Instructions | Cycles/Operation | Contributing Cycles |
|---|---|---|---|
| add | 4 ADDC | 4 | 4 × 6 = 24 |
| exclusive-or | 4 XRL | 4 | 4 × 2 = 8 |
| squaring | 6 MUL, 11 ADDC | 35 | 35 × 2 = 70 |
| rotate left by 5 | 12 RRC | 12 | 12 × 2 = 24 |
| rotate left by r | 8 RRC or RLC, 8 JB | 24 | 24 × 2 = 48 |
| Total | | | 174 |

Taking conservative account of the addressing instructions, the pre-whitening, post-whitening and any additional overheads, we estimate that encrypting one block of data with RC6™-32/20/16 requires about (174×20)×4= 13,920 cycles. Assuming that a single cycle on the Intel MCS-51 microcontroller takes one microsecond, an estimate for the encryption speed of RC6™-32/20/16 on this particular processor is about (1,000,000/13,920)×128=9.2 Kbits/second. As for the key setup, the dominant loop in the FIG. 5 process is the second for loop. For b=16, 24, 32 and r=20, the number of iterations in this loop is v=max {20×2+4, b/4}=132, which is independent of b. Each iteration in the second for loop uses four 32-bit additions, one rotate to the left by three, and one variable rotate to the left by r. In addition, there are some 8-bit operations which will be included as overheads. Following an analysis similar to that given above for the encryption process, the total estimated number of cycles for each iteration, ignoring addressing instructions, is 52. Again, making a conservative estimate for the additional overheads, we estimate about (52×132)× 4=27,456 cycles to set up a 128-, 192- or 256-bit key, which will require about 27 milliseconds on an Intel MCS-51 microcontroller.

An estimate of hardware requirements for a custom or semi-custom hardware implementation of the invention will now be provided. The most relevant parameters are the silicon area, speed and power consumption of a 32×32 integer multiplication. We estimate that this multiplication may require 120×100 microns (0.012 mm$^2$) in area with a standard 0.25 micron CMOS process, about three ns for each multiply operation, and a power consumption of about five milliwatts. We conservatively estimate that a 32-bit variable rotate, i.e., a "barrel shifter," would take about half of the area of the multiplier (0.006 mm$^2$) and one ns for each operation. Also, we estimate that a 32-bit full adder would take one-quarter of the full multiplier area and around one ns. In addition, the function $f(x)=x(2x+1)(\mod 2^w)$ can be computed by using only a multiplier that returns the bottom 32 bits of the 64-bit product rather than implementing a full 32×32 multiplier. We estimate that such a "partial" multiplier would take around 60% of the area of the full multiplier and a computation time of about three ns. Estimating an area of zero and computation time of zero for a 32-bit exclusive-or, and an area of 0.003 mm$^2$ and a computation time of one ns for a 32-bit carry-propagate add, the total required area is about 0.016 mm$^2$ and the total required computation time is 5 ns. For an efficient implementation, two such sets of circuitry might be included on one chip. As a result, the total area would be about 0.032 mm$^2$ for those parts directly relevant to RC6™-32/20/16, with an additional 0.018 mm$^2$ for control, input/output and other overhead operations. The total computational area required in this exemplary hardware implementation is therefore on the order of 0.05 mm$^2$. Assuming that power consumption is proportional to area, we have a total power budget of about 21 milliwatts. With 20 rounds per block, we have a total encryption time of approximately 5×20=100 ns for each block, giving an estimated data rate of about 1.3 Gbits/second. We would expect the decryption time to be similar to that required for encryption, and for both encryption and decryption time to be independent of the length of the user-supplied key. It should be noted that the above estimates are somewhat crude but also conservative. Savings might be possible by, for example, using only a multiplier that returns the bottom 32 bits rather than implementing a full 32×32 bit multiplier, or by implementing a circuit for squaring. It would also be possible to "unwind" the main encryption loop 20 times in some modes of use, which would allow for greatly improved performance at the cost of additional area and power consumption.

In terms of security, the best attack on RC6™ appears to be an exhaustive search for the user-supplied encryption key. The data requirements to mount more sophisticated attacks, such as differential and linear cryptanalysis, can be shown to exceed the available data. In addition, there are no known examples of so-called "weak" keys.

It should again be emphasized that the encryption and decryption techniques described herein are exemplary and should not be construed as limiting the present invention to any particular embodiment or group of embodiments. Alternative embodiments may use functions other than the exemplary quadratic described above, including polynomial functions with degree greater than two. In addition, the output of the function need not be taken mod $2^w$. Moreover, although illustrated in an embodiment utilizing 32-bit words and a corresponding block size of 128 bits, the invention can be readily extended to other block sizes as required. For example, the invention could be configured with a 64-bit word size and a corresponding block size of 256 bits to take advantage of the performance offered by the next generation of system architectures. In addition, the illustrative embodiment of FIGS. 1 through 4 allows one to exploit a certain degree of parallelism in the encryption and decryption routines. For example, the computation of t and u at each round can be performed in parallel as can the updates of values such as A and C. It can therefore be expected that embodiments of the invention will show improved throughput as processors move to include an increasing amount of internal parallelism. These and numerous other alternative embodiments within the scope of the appended claims will be readily apparent to those of ordinary skill in the art.

What is claimed is:

1. A method of encrypting a plaintext message, comprising the steps of:

(a) segmenting the plaintext message into a plurality of words;

(b) applying an integer multiplication function to at least one of the words;

(c) rotating a value which is based on the result of the applying step (b) by a first number of bits;

(d) rotating a value which is based on the result of the rotating step (c) by a second number of bits derived from another one of the words;

(e) applying a secret key to a value which is based on the result of step (d); and (f) repeating steps (b), (c), (d) and (e) for a designated number of rounds.

2. The method of claim 1 wherein at least one of the values which are based on the result of the applying step (b), the rotating step (c) and the rotating step (d) is the corresponding result itself.

3. The method of claim 1 wherein the integer multiplication function is a quadratic function of the form $f(x)=x(ax+b)$, where a and b are integers.

4. The method of claim 3 wherein a is an even integer and b is an odd integer.

5. The method of claim 3 wherein a is zero and b is an odd integer which varies from round to round.

6. The method of claim 3 wherein the integer multiplication function is a quadratic function of the form $f(x)=x(ax+b)(\bmod 2^w)$, where w is the number of bits in a given one of the words.

7. The method of claim 1 wherein the rotating step (c) includes rotating a result of the applying step (b) by a predetermined number of bits given by lg w, where lg denotes log base 2 and w is the number of bits in a given one of the words.

8. The method of claim 1 wherein step (a) includes segmenting the plaintext message into four words, step (b) includes applying the integer multiplication function to two of the four words, and step (c) includes rotating each of the two results of step (b) by a predetermined number of bits to generate two corresponding intermediate results.

9. The method of claim 8 wherein steps (d) and (e) for a given one of the two words subject to steps (b) and (c) include the steps of:
   (i) computing an exclusive-or of one of the other words and one of the two intermediate results;
   (ii) rotating the result of step (i) by an amount given by the other intermediate result; and
   (iii) applying an element of a secret key array to the result of step (ii).

10. The method of claim 1 further including the steps of storing the plurality of words in a corresponding plurality of registers as part of segmenting step (a), and transposing the contents of the registers after performing the applying step (e).

11. The method of claim 1 further including the steps of pre-whitening at least a subset of the plurality of words before performing step (a) by applying an element of a secret key array to the subset.

12. The method of claim 1 further including the steps of post-whitening at least a subset of the plurality of words after performing step (f) by applying an element of a secret key array to the subset.

13. An apparatus for encrypting a plaintext message, comprising:
   a memory for storing at least a portion of a secret key; and
   a processor associated with the memory, wherein the processor is operative:
      (a) to segment the plaintext message into a plurality of words;
      (b) to apply an integer multiplication function to at least one of the words;
      (c) to rotate a value which is based on the result of operation (b) by a first number of bits;
      (d) to rotate a value which is based on the result of operation (c) by a second number of bits derived from another one of the words;
      (e) to apply the portion of the secret key to a value which is based on the result of operation (d); and
      (f) to repeat operations (b), (c), (d) and (e) for a designated number of rounds.

14. The apparatus of claim 13 wherein at least one of the values which are based on the result of the apply operation (b), the rotate operation (c) and the rotate operation (d) is the corresponding result itself.

15. The apparatus of claim 13 wherein the integer multiplication function is a quadratic function of the form $f(x)=x(ax+b)$, where a and b are integers.

16. The apparatus of claim 15 wherein a is an even integer and b is an odd integer.

17. The apparatus of claim 15 wherein a is zero and b is an odd integer which varies from one of the rounds to another of the rounds.

18. The apparatus of claim 15 wherein the integer multiplication function is a quadratic function of the form $f(x)=x(ax+b)(\bmod 2^w)$, where w is the number of bits in a given one of the words.

19. The apparatus of claim 13 wherein operation (c) includes rotating a result of operation (b) by a predetermined number of bits given by lg w, where lg denotes log base 2 and w is the number of bits in a given one of the words.

20. The apparatus of claim 13 wherein operation (a) includes segmenting the plaintext message into four words, operation (b) includes applying the integer multiplication function to two of the four words, and operation (c) includes rotating each of the two results of operation (b) by a predetermined number of bits to generate two corresponding intermediate results.

21. The apparatus of claim 20 wherein the processor is further operative to implement operations (d) and (e) for a given one of the two words subject to operations (b) and (c) by:
   (i) computing an exclusive-or of one of the other words and one of the two intermediate results;
   (ii) rotating the result of operation (i) by an amount given by the other intermediate result; and
   (iii) applying an element of a secret key array to the result of operation (ii).

22. The apparatus of claim 13 wherein the processor is further operative to store the plurality of words in a corresponding plurality of registers as part of operation (a), and to transpose the contents of the registers after performing operation (e).

23. The apparatus of claim 13 wherein the processor is further operative to pre-whiten at least a subset of the plurality of words, before performing operation (a), by applying an element of a secret key array to the subset.

24. The apparatus of claim 13 wherein the processor is further operative to post-whiten at least a subset of the plurality of words after performing operation (f), by applying an element of a secret key array to the subset.

25. A computer-readable medium for storing one or more programs for encrypting a plaintext message, wherein the one or more programs when executed implement the steps of:
   (a) segmenting the plaintext message into a plurality of words;
   (b) applying an integer multiplication function to at least one of the words;
   (c) rotating a value which is based on the result of the applying step (b) by a first number of bits;
   (d) rotating a value which is based on the result of the rotating step (c) by a second number of bits derived from another one of the words;
   (e) applying a secret key to a value which is based on the result of step (d); and
   (f) repeating steps (b), (c), (d) and (e) for a designated number of rounds.

26. A method of decrypting a ciphertext message, comprising the steps of:
   (a) segmenting the ciphertext message into a plurality of words;

(b) applying an integer multiplication function to at least one of the words;

(c) rotating a value which is based on the result of the applying step (b) by a first number of bits;

(d) rotating a value which is based on the result of the rotating step (c) by a second number of bits derived from another one of the words;

(e) applying a secret key to a value which is based on the result of step (d); and (f) repeating steps (b), (c), (d) and (e) for a designated number of rounds.

27. An apparatus for decrypting a ciphertext message, comprising:

a memory for storing at least a portion of a secret key; and a processor associated with the memory, wherein the processor is operative:

(a) to segment the ciphertext message into a plurality of words;

(b) to apply an integer multiplication function to at least one of the words;

(c) to rotate a value which is based on the result of operation (b) by a first number of bits;

(d) to rotate a value which is based on the result of operation (c) by a second number of bits derived from another one of the words;

(e) to apply the portion of the secret key to a value which is based on a result of operation (d); and (f) to repeat operations (b), (c), (d) and (e) for a designated number of rounds.

28. The method of claim 1 wherein the first number of bits is zero.

29. The apparatus of claim 13 wherein the first number of bits is zero.

* * * * *